US011841961B2

(12) United States Patent
Brodie et al.

(10) Patent No.: US 11,841,961 B2
(45) Date of Patent: Dec. 12, 2023

(54) MANAGEMENT OF COMPUTING SECRETS

(71) Applicant: International Business Machines Corporation, Armonk, NY (US)

(72) Inventors: Rob Brodie, Pagewood (AU); John William Alcorn, Youngsville, NC (US); Jeremy Caine, Sydney (AU); Gregory R. Hintermeister, Rochester, MN (US); Max Veit, Tübingen (DE)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/919,228

(22) Filed: Jul. 2, 2020

(65) Prior Publication Data

US 2022/0004651 A1 Jan. 6, 2022

(51) Int. Cl.
*G06F 21/62* (2013.01)
*G06F 16/17* (2019.01)

(52) U.S. Cl.
CPC ......... *G06F 21/6209* (2013.01); *G06F 16/17* (2019.01)

(58) Field of Classification Search
CPC .............................. G06F 21/6209; G06F 16/17
See application file for complete search history.

(56) References Cited

U.S. PATENT DOCUMENTS

| | | | | |
|---|---|---|---|---|
| 6,668,279 B1 * | 12/2003 | Curtis | ..................... | H04L 67/02 719/310 |
| 7,117,364 B1 * | 10/2006 | Hepper | .............. | G06Q 20/3552 713/168 |
| 7,178,021 B1 * | 2/2007 | Hanna | ................... | H04L 9/0825 713/150 |
| 7,185,196 B1 * | 2/2007 | Kuskin | ................. | H04L 63/062 709/227 |
| 8,099,791 B1 * | 1/2012 | Adkins | ................... | G06F 21/64 713/184 |
| 8,170,213 B1 * | 5/2012 | Harwood | .............. | H04L 9/0894 711/100 |
| 8,402,278 B2 * | 3/2013 | Gassoway | ........... | G06F 21/6209 726/28 |
| 8,881,249 B2 | 11/2014 | Nunn et al. | | |
| 9,569,240 B2 * | 2/2017 | Tompkins | ............. | G06F 9/4843 |

(Continued)

FOREIGN PATENT DOCUMENTS

| | | | |
|---|---|---|---|
| CN | 101751529 | A | 6/2010 |
| CN | 107359990 | A | 11/2017 |
| CN | 107819729 | A | 3/2018 |
| CN | 109891849 | A | 6/2019 |

OTHER PUBLICATIONS

Wedin et al., Automatic secret synchronisation across heterogeneous IT environments, SemanticScholar, 2019, 76 pages.

(Continued)

*Primary Examiner* — Vance M Little
(74) *Attorney, Agent, or Firm* — Grant M. McNeilly

(57) ABSTRACT

A method can include receiving a read request from a client program. The method can further include obtaining, in response to receiving the read request, one or more secrets from a secrets store. The obtaining can include storing the one or more secrets in a storage location. The method can further include initiating, in response to the read request, a transmission of the one or more secrets to the client program. The method can further include deleting the one or more secrets from the storage location.

20 Claims, 5 Drawing Sheets

(56) References Cited

U.S. PATENT DOCUMENTS

| | | | |
|---|---|---|---|
| 9,722,779 B1 | 8/2017 | Tomomura | |
| 2003/0093552 A1* | 5/2003 | Nonogaki | G06Q 40/04 709/228 |
| 2003/0226031 A1* | 12/2003 | Proudler | G06F 21/62 726/16 |
| 2007/0160201 A1* | 7/2007 | Blom | H04L 9/0891 380/30 |
| 2009/0257596 A1* | 10/2009 | Piccinini | G06F 21/6209 380/279 |
| 2010/0262594 A1* | 10/2010 | Venkataraja | G06F 16/10 707/715 |
| 2012/0110328 A1* | 5/2012 | Pate | H04L 63/045 713/165 |
| 2013/0339313 A1* | 12/2013 | Blaine | G06F 11/0727 707/691 |
| 2014/0010371 A1* | 1/2014 | Khazan | H04L 9/0819 380/278 |
| 2015/0089247 A1 | 3/2015 | Kang | |
| 2016/0085480 A1* | 3/2016 | Chiu | G06F 3/0611 711/117 |

OTHER PUBLICATIONS

Sharma, M., "Delivering Secrets Management for Database Connectivity with Vault—Part 1", Jan. 28, 2019, 4 pages.

Sharma, M., "Delivering Secrets Management for Database Connectivity with Vault—Part 2", Feb. 5, 2019, 10 pages.

Anonymous, "Secure layers for container technologies", An IP.com Prior Art Database Technical Disclosure, IP.com No. IPCOM000253480D, IP.com Electronic Publication Date: Apr. 3, 2018, 3 pages.

Mell et al., "The NIST Definition of Cloud Computing", Recommendations of the National Institute of Standards and Technology, Sep. 2011, 7 pages.

Patent Cooperation Treaty PCT International Search Report and Written Opinion of the International Searching Authority, International Application No. PCT/CN2021/102413, International filing date Jun. 25, 2021, dated Sep. 26, 2021, 9 pages.

* cited by examiner

MANAGEMENT OF COMPUTING SECRETS

BACKGROUND

The present disclosure relates to communication between computing system components, and more specifically, to management of computing secrets.

Computing systems, such as computing systems having multi-tier architectures, can be configured such that discrete system components communicate with one another through externalized interfaces. For security purposes, such discrete system components can be configured to obtain secrets, such as tokens, keys, and/or passwords, from other system components prior to permitting access to data. Such secrets can verify an identity and/or authenticity of a first system component attempting to access data of a second system component.

SUMMARY

According to embodiments of the present disclosure, a method can include receiving a read request from a client program. The method can further include obtaining one or more secrets from a secrets store. The obtaining can be performed in response to the receiving the read request. The obtaining can include storing the one or more secrets in a storage location. The method can further include initiating a transmission of the one or more secrets to the client program. The initiating can be performed in response to the read request. The method can further include deleting the one or more secrets from the storage location.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
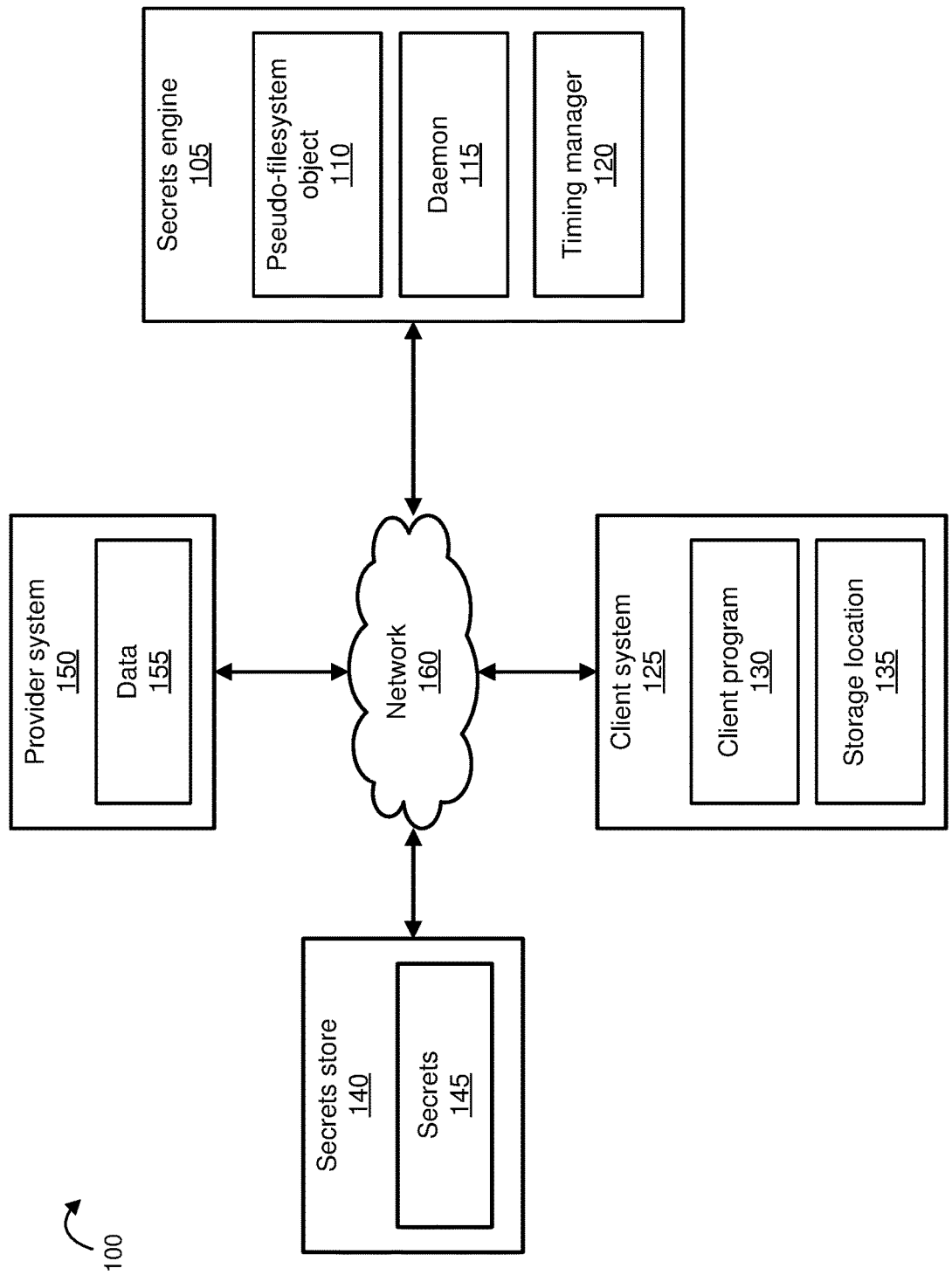
FIG. 1 depicts an example computing environment having secrets engine, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to communication between computing system components; more particular aspects relate to management of computing secrets. While the present disclosure is not necessarily limited to such applications, various aspects of the disclosure may be appreciated through a discussion of various examples using this context.

Computing systems, such as computing systems having multi-tier architectures, can be configured such that discrete system components communicate with one another through externalized interfaces. For security purposes, such discrete system components can be configured to obtain secrets, such as tokens, keys, and/or passwords, from other system components prior to permitting access to data. Such secrets can verify an identity and/or authenticity of a first system component attempting to access data of a second system component.

In some instances, a computing system can be configured such that secrets are stored in filesystem objects, such as computer files. Such filesystem objects can be stored on one or more discrete system components. In these instances, a first discrete system component (e.g., a client system) storing such a filesystem object can obtain a secret by reading the filesystem object. Afterward, the first system component can transmit the secret to a second system component (e.g., a provider system). In response to receiving the secret, the second system component can verify the identity of the first system component and permit the first system component to access data.

Such storage of secrets in filesystem objects can render computing systems vulnerable to intrusion, as the filesystem objects can potentially remain accessible on a discrete system component indefinitely. Thus, the secret can be susceptible to compromise any time the discrete system component is susceptible to compromise. Additionally, modifying such computing systems to store and/or access secrets from a location external to the discrete system component can require custom programming for a plurality of discrete system components. Such modifications can include introducing additional interfaces, operations, and synchronization parameters between each discrete system component and one or more external devices where a secret can be stored. Accordingly, such modifications can be cumbersome to implement and to maintain.

To address these and other challenges, embodiments of the present disclosure include a secrets engine. In some embodiments, the secrets engine can abstract the management of secrets in computing systems that are configured to employ secrets stored in filesystem objects. More specifically, in some embodiments, the secrets engine can obtain a secret from a secrets store, present the secret as data content of a pseudo-filesystem object, and delete the secret. In some embodiments, the pseudo-filesystem object can be configured to have a function and an appearance that resembles a function and an appearance of a filesystem object that stores a secret. Thus, in some embodiments, the secrets engine can perform operations, such as obtaining and presenting a secret, in response to one or more operations by a computer program to read the pseudo-filesystem object. Therefore, in some embodiments, the secrets engine can replace such a filesystem object in a manner that can be unrecognized by one or more system components.

Embodiments of the present disclosure can include a plurality of benefits. For example, in some embodiments, the secrets engine can obtain a secret in response to a read request and delete the secret in response to an indication that the secret is read. Thus, embodiments of the present disclosure can limit the presence of a secret on a discrete system component, which can reduce one or more vulnerabilities to intrusion of the discrete system component and/or a corresponding computing system.

In some embodiments, program instructions of the secrets engine can allow a discrete system component to obtain a secret from one or more secrets stores. Such operability can be available to the discrete system component without a need to introduce modifications, such as custom modifications to program instructions of the discrete system component for enabling communication with the one or more secrets stores. Thus, embodiments of the present disclosure can facilitate efficient integration with existing computing systems. Additionally, such integration can be facilitated by the secrets engine's ability to perform secrets management based simply on one or more read operations directed to a pseudo-filesystem object. Accordingly, embodiments of the present disclosure can allow discrete system components of a computing system to communicate efficiently and with improved security.

Turning to the figures, FIG. 1 illustrates a computing environment 100 that includes one or more of each of a secrets engine 105, a client system 125, a secrets store 140, a provider system 150, and/or a network 160. In some embodiments, at least one secrets engine 105, client system 125, secrets store 140, and/or provider system 150 can exchange data with at least one other through the at least one network 160. For example, in some embodiments, at least one secrets engine 105 can exchange data with at least one secrets store 140 through the at least one network 160. One or more of each of the secrets engine 105, client system 125, secrets store 140, provider system 150, and/or network 160 can include a computer system, such as the computer system 301 discussed with respect to FIG. 3.

In some embodiments, the secrets engine 105 can be included in software installed on a computer system of the client system 125. For example, in some embodiments, the secrets engine 105 can be included as a plug-in software component of software installed on the client system 125. The secrets engine 105 can include program instructions implemented by a processor, such as a processor of the client system 125, to perform one or more operations discussed with respect to FIG. 2.

In some embodiments, the secrets engine 105 can be a computer program that can include one or more modules, such as one or more of a pseudo-filesystem object 110, a daemon 115, and/or a timing manager 120. In some embodiments, one or more of the pseudo-filesystem object 110, daemon 115, and/or timing manager 120 can be integrated into a single module. In some embodiments, one or more of the pseudo-filesystem object 110, daemon 115, and/or timing manager 120 can include program instructions implemented by a processor, such as a processor of the client system 125, to perform one or more operations discussed with respect to FIG. 2. For example, in some embodiments, the pseudo-filesystem object 110 can include program instructions to perform operation 205, FIG. 2. In some embodiments, the daemon 115 can include program instructions to perform operations 215 and 225-235, FIG. 2. In some embodiments, the timing manager 120 can include program instructions to perform operations 210 and 220, FIG. 2.

Turning back to FIG. 1, in some embodiments, the pseudo-filesystem object 110 can mimic a filesystem object, such as a computer file that stores data (e.g., a secret).

Mimicking a filesystem object can refer to the pseudo-filesystem object 110 exhibiting one or more properties and/or characteristics of a filesystem object.

For example, in some embodiments, like a filesystem object, the pseudo-filesystem object 110 can receive a request from a computer program, such as client program 130, to be read (e.g., to present data to the computer program). In response, like a filesystem object, the pseudo-filesystem object 110 can present data to such a computer program. In another example, in some embodiments, a computer program requesting data from the pseudo-filesystem object 110 can open a file descriptor, just as a computer program requesting data from a filesystem object can include the computer program opening a file descriptor. Continuing with this example, the computer program can close the file descriptor corresponding to the pseudo-filesystem object 110 in response to the computer program obtaining data from the pseudo-filesystem object 110. Such closing can be analogous to the computer program closing a file descriptor corresponding to a filesystem object, in response to the computer program obtaining data from the filesystem object. In some embodiments, a file descriptor can include an identification, such as an alphanumeric code, that corresponds to a filesystem object that is accessed by a computer program. Thus, opening a file descriptor can include a computer program generating and storing such an identification when the computer program accesses a filesystem object or a pseudo-filesystem object; closing the file descriptor can include the computer program removing such an identification (e.g., deleting the file descriptor and/or deleting an association between a file descriptor and a filesystem object) in response to retrieving data from the filesystem object or pseudo-filesystem object. Thus, in some embodiments, by mimicking a filesystem object, the pseudo-filesystem object 110 can present data to a computer program in response to an operation by the computer program to read the pseudo-filesystem object 110; such data presentation can be substantially similar to a filesystem object presenting data to a computer program when the computer program reads the filesystem object.

In another example, in some embodiments, the pseudo-filesystem object 110 can be stored in a manner that resembles a manner in which a filesystem object can be stored. For example, in some embodiments, the pseudo-filesystem object 110 can be stored in a location where a filesystem object is typically stored. In another example, in some embodiments, the pseudo-filesystem object 110 can include a file name that is identical or substantially similar to a file name of a filesystem object. Thus, in some embodiments, by mimicking a filesystem object, the pseudo-filesystem object 110 can have a function and an appearance that resembles a function and an appearance of a filesystem object.

In some embodiments, the daemon 115 can perform operations such as obtaining an indication of an opened file descriptor, obtaining one or more secrets 145, initiating a transmission of the one or more secrets 145, obtaining an indication of a closed file descriptor, and/or deleting the one or more secrets 145. In some embodiments the daemon 115 can perform such operations with respect to the corresponding pseudo-filesystem object 110 of the secrets engine 105. In some embodiments, the timing manager 120 can initiate a timer and determine when a threshold time expires.

In some embodiments, the client system 125 can include a computing device configured to obtain data 155 from a provider system 150. The client system 125 can include a client program 130 and a storage location 135. In some embodiments, the client program 130 can include a computer program having program instructions to perform operations such as reading (e.g., obtaining data from) filesystem objects, obtaining one or more secrets and transmitting the one or more secrets to the provider system 150, obtaining data 155, opening a file descriptor, and/or closing a file descriptor. In some embodiments, the storage location 135 can include memory, such as memory 320, discussed with respect to FIG. 3. In some embodiments, the storage location 135 can include random access memory ("RAM") of the client system 125.

In some embodiments, the secrets store 140 can include a computing device, such as a Web server, that can store one or more secrets 145. In some embodiments, the secrets store 140 can employ a plurality of data security features, such as one or more layers of encryption, to restrict access to the one or more secrets 145. Secrets 145 can include data used by an entity, such as a client program 130, to access data, such as data 155. For example, in some embodiments, secrets 145 can include data such as passwords, connection strings, usernames, keys, and/or tokens.

In some embodiments, the provider system 150 can include a computing device, such as a Web server, that can store data 155. In some embodiments, the provider system 150 can permit access to the data 155 in response to receiving one or more secrets 145 from a client program 130 of a client system 125.

In some embodiments, the network 160 can be a wide area network (WAN), a local area network (LAN), the internet, or an intranet. In some embodiments, the network 160 can be substantially similar to, or the same as, cloud computing environment 50 discussed with respect to FIG. 4.

In an example operation of the secrets engine 105, the client system 125 can be an automated teller machine ("ATM") configured to obtain data 155 (e.g., account balance data) from a provider system 150 (e.g., a server of a banking institution) through a network 160. Further in this example, the client system 125 can be configured to store a filesystem object (e.g., a computer file), and the filesystem object can store a secret (e.g., an authentication code for accessing the data 155 of the provider system 150). The client program 130 can be configured to obtain the secret by reading the filesystem object. However, in this example, by employing the secrets engine 105, the client system 125 does not store such a filesystem object that includes such a secret. Instead, in this example, the client program 130 can obtain such a secret by transmitting a read request to the pseudo-filesystem object 110. In response to such a read request, daemon 115 can obtain a secret 145 (e.g., an authentication code) from a secrets store 140 (e.g., a secure Web server) and store the secret 145 in a storage location 135 (e.g., RAM of the client system 125). Further in this example, the daemon 115 can present the secret 145 as content of the pseudo-filesystem object 110 that can be obtained by the client program 130. Accordingly, in this example, the pseudo-filesystem object 110 can serve as a substitute for a filesystem object that stores a secret. Continuing with this example, in response to receiving an indication that the client program 130 has retrieved the secret 145 (e.g., an indication that a file descriptor is closed), the daemon 115 can delete the secret 145 from the storage location 135. Continuing with this example, the client program 130 can transmit the secret 145 (e.g., authentication code) to the provider system 150 (e.g., server of a banking institution) to access data 155 (e.g., account balance data). Further operations of the present disclosure are discussed below, with respect to FIG. 2.

Figure 2:
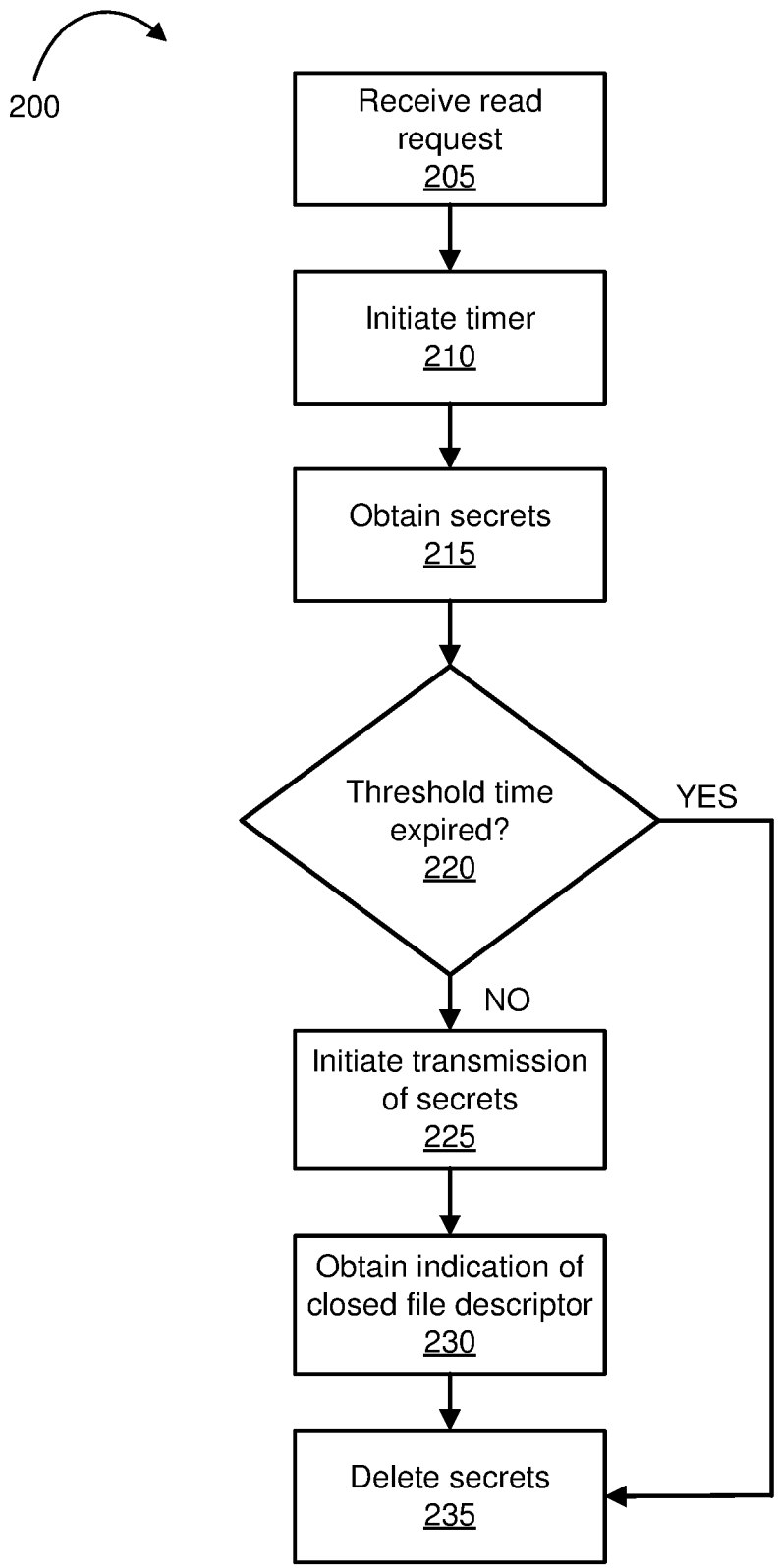
FIG. 2 depicts a flowchart of an example method for performing secrets management, in accordance with embodiments of the present disclosure.

FIG. 2 illustrates a flowchart of an example method 200 for managing one or more secrets, in accordance with embodiments of the present disclosure. Method 200 can be performed by a secrets engine, such as the secrets engine 105, FIG. 1.

Referring back to FIG. 2, in operation 205, the secrets engine can receive a read request. In some embodiments, a read request can refer to a request issued by a computer program, such as client program 130, FIG. 1, to obtain data from a file system object. In some embodiments, a read request can refer to a command issued by such a computer program for a filesystem object to provide data to the computer program. In some embodiments, operation 205 can include the secrets engine obtaining an indication, at an initial time, that a file descriptor is opened. In these embodiments, such a file descriptor can correspond to a pseudo-filesystem object of the secrets engine.

For example, in some embodiments, a pseudo-filesystem object of the secrets engine can receive a read request from a client program of a client system. The read request can be based on the client program requesting data from the pseudo-filesystem object. In some embodiments, the client program can open a file descriptor when it requests data from the pseudo-filesystem object. The client program can store the file descriptor on a discrete system component, such as the client system 125, FIG. 1. In these embodiments, a daemon of the secrets engine can include program instructions to monitor a discrete system component, such as the client system, to detect when a file descriptor corresponding to the pseudo-filesystem object is opened (e.g., when an alphanumeric code corresponding to the pseudo-filesystem object is generated and/or stored).

In operation 210, the secrets engine can initiate a timer. For example, in response to operation 205, a timing manager of the secrets engine can start a timer to monitor an elapsed time and determine when a threshold time, such as 5 seconds, is expired. In some embodiments, the threshold time can be selected by an entity such as a programmer of the secrets engine.

In operation 215, the secrets engine can obtain one or more secrets from a secrets store, such as the secrets store 140, FIG. 1. In some embodiments, operation 215 can include the secrets engine accessing secrets stored in the secrets store and storing one or more secrets from the secrets store. In some embodiments, the secrets engine can perform operation 215 in response to receiving a read request in operation 205. In some embodiments, the secrets engine can perform operation 215 in response to obtaining, in operation 205, an indication that a file descriptor corresponding to a pseudo-filesystem object is opened. In some embodiments, operation 215 can include a daemon of the secrets engine obtaining one or more secrets from a secrets store through one or more encrypted channels. In some embodiments, operation 215 can include a daemon of the secrets engine temporarily storing the one or more secrets in a storage location, such as in memory of a client system.

In operation 220, the secrets engine can determine whether a threshold time is expired. In operation 220, if the secrets engine determines that the threshold time is expired, then the secrets engine can proceed to operation 235. Alternatively, if the secrets engine determines that the threshold time is not expired, then the secrets engine can proceed to operation 225.

For example, in operation 220, a timing manager of the secrets engine can determine whether the elapsed time following the initiation, in operation 210, of the timer is equal to a threshold time. In this example, the threshold time is expired when the elapsed time equals the threshold time. In some embodiments, operation 220 can provide additional security to the secrets management performed by the secrets engine, as operation 220 can prevent the one or more secrets from remaining accessible on a discrete system component indefinitely.

In operation 225, the secrets engine can initiate, in response to the read request received in operation 205, a transmission of the one or more secrets obtained in operation 215. In some embodiments, such initiating can include a daemon of the secrets engine presenting the one or more secrets inside the pseudo-filesystem object as data content of the pseudo-filesystem object. In some embodiments, operation 215 can include a daemon of the secrets engine presenting the one or more secrets in encoded text, such as base64 encoded text. In some embodiments, in operation 225, the secrets engine can allow a computer program, such as client program 130, FIG. 1, to retrieve the one or more secrets from the pseudo-filesystem object.

In operation 230, the secrets engine can obtain an indication of the file descriptor corresponding to the pseudo-filesystem object being closed. In some embodiments, the secrets engine can obtain such an indication at a second time that is subsequent to the initial time. For example, in some embodiments, a computer program (e.g., client program 130, FIG. 1) can close a file descriptor in response to retrieving one or more secrets from the pseudo-filesystem object. In these embodiments, a daemon of the secrets engine can include program instructions to monitor a discrete system component (e.g., client system 125, FIG. 1) to detect when the file descriptor corresponding to the pseudo-filesystem object is closed (e.g., when the file descriptor and/or an association between the file descriptor and the pseudo-filesystem object is deleted).

In operation 235, the secrets engine can delete the one or more secrets stored in operation 215. In some embodiments, the secrets engine can perform operation 235 in response to obtaining, in operation 230, the indication of the file descriptor corresponding to the pseudo-filesystem object being closed. In some embodiments, operation 235 can include a daemon of the secrets engine removing the one or more secrets from their presentation inside the pseudo-filesystem object as data content. In some embodiments, operation 235 can include a daemon of the secrets engine removing the one or more secrets from the storage location. In some embodiments, operation 235 can include a timing manager of the secrets engine ending its monitoring of an elapsed time.

Figure 3:
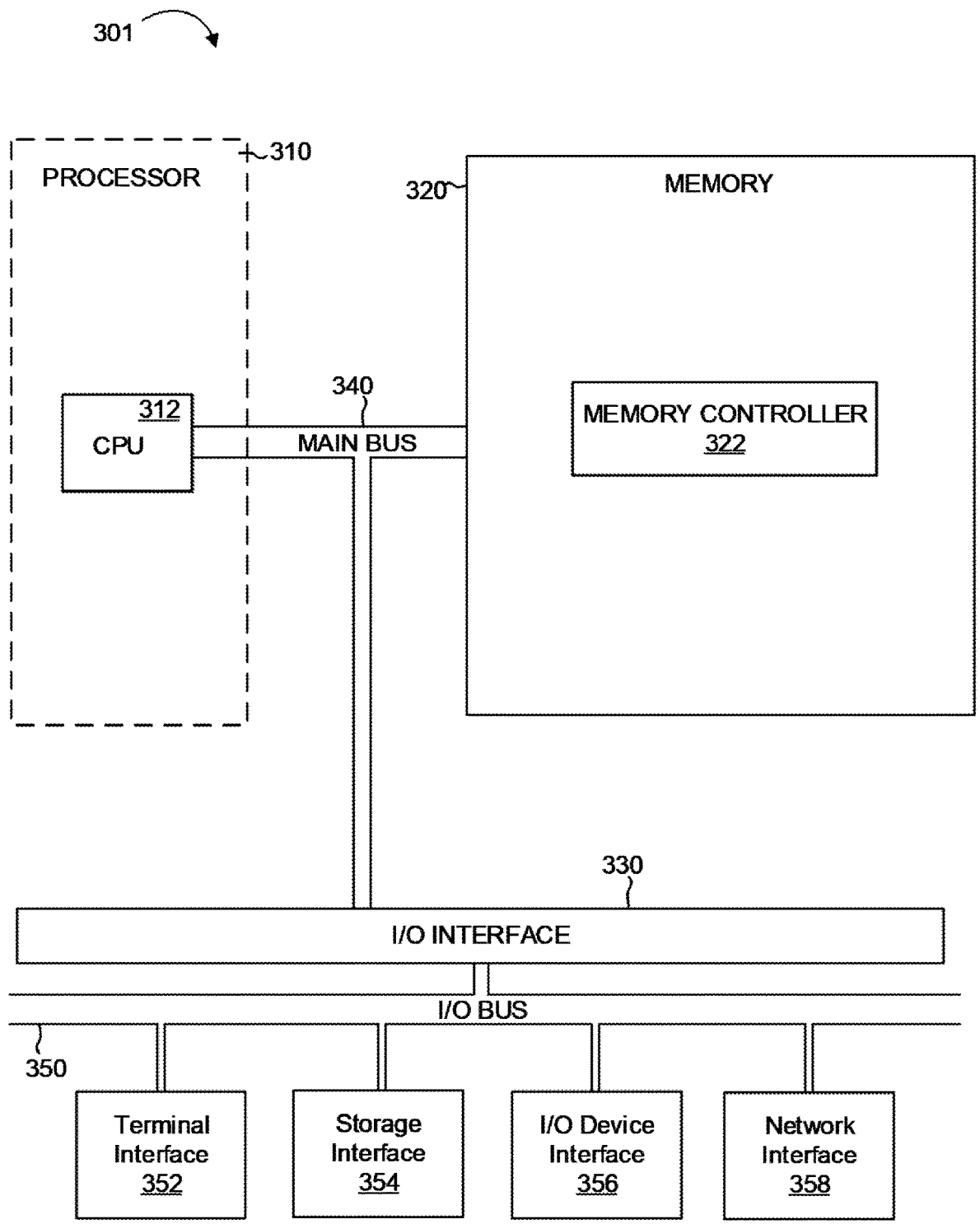
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
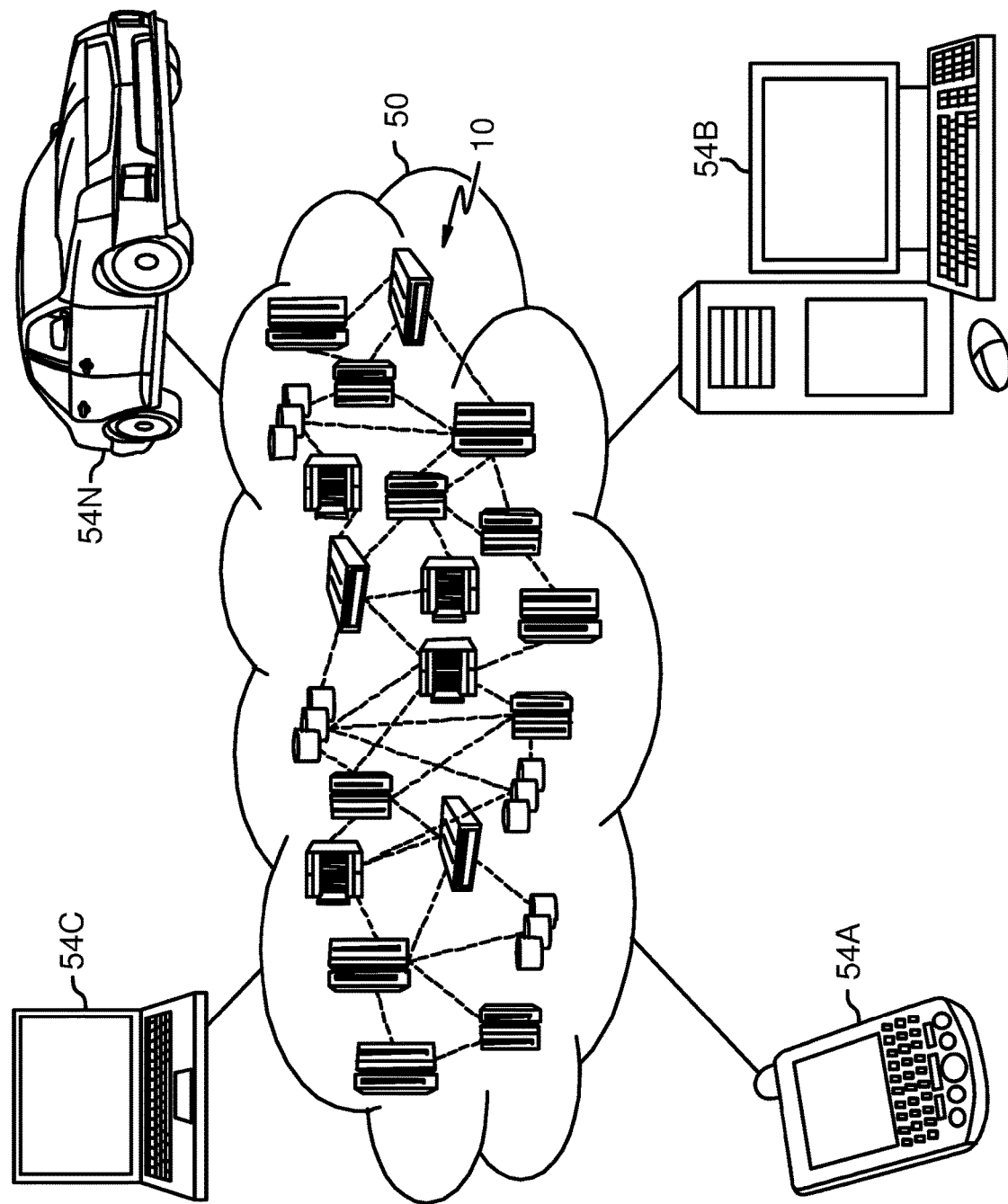
FIG. 4 depicts a cloud computing environment according to embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
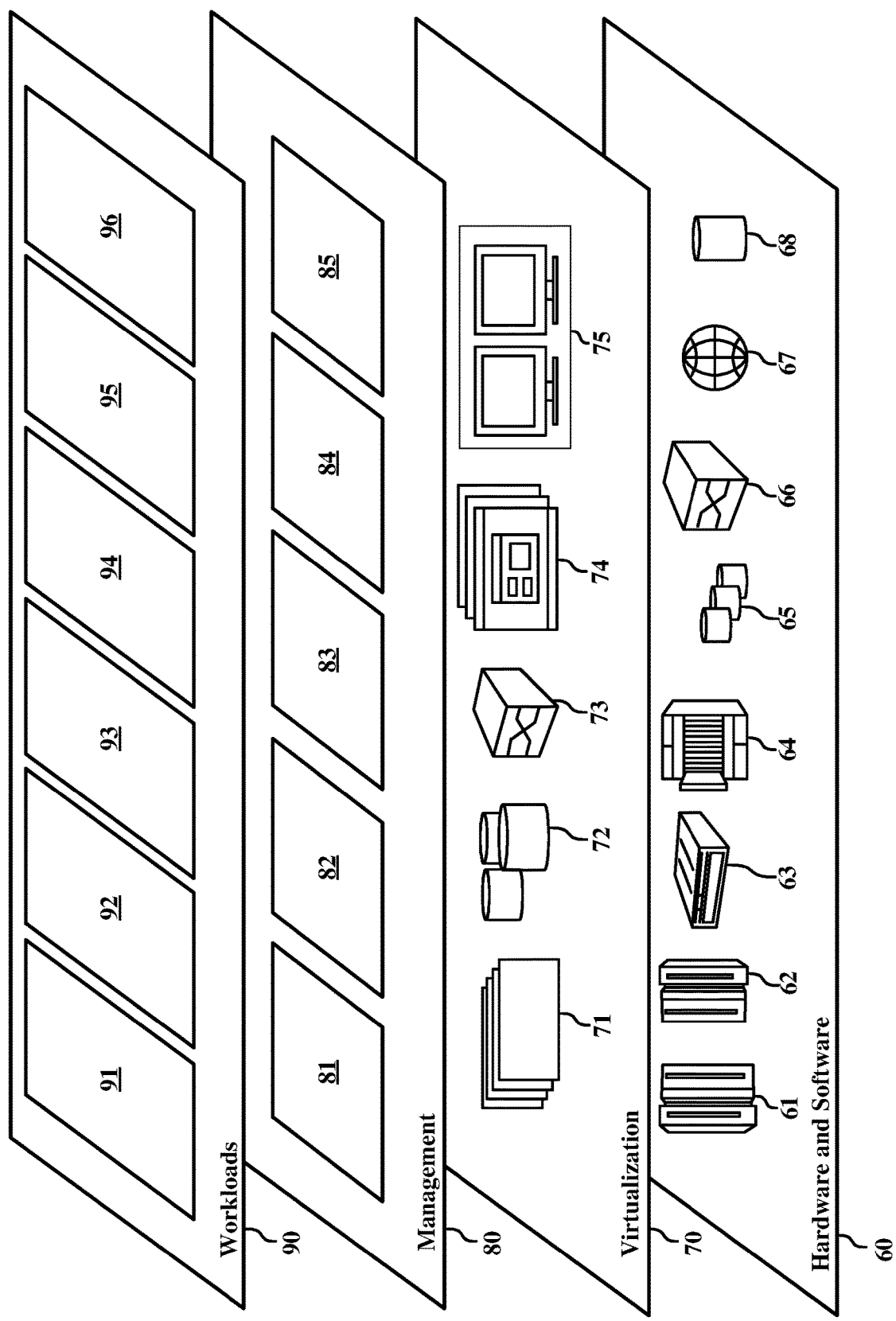
FIG. 5 depicts abstraction model layers according to embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and secrets management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a secrets engine, a first read request from a client program in a client system;
    initiating, by the secrets engine, a timer in response to receiving the first read request;
    obtaining, by the secrets engine, in response to the receiving the first read request, one or more first secrets from a secrets store, wherein the one or more first secrets are stored in one or more filesystem objects in the secrets store;
    wherein the obtaining includes:
        receiving the one or more first secrets via an encrypted communication channel with the secrets store; and
        storing the one or more first secrets in a first storage location in the secrets engine, wherein the one or more first secrets are stored in one or more pseudo-filesystem objects in the first storage location;
    determining if the timer has exceeded a threshold time;
    initiating, in response to the first read request, a transmission of the one or more first secrets to the client program in response to determining that the timer has not exceeded the threshold time;
    storing, by the client system, the one or more first secrets in a second storage location in the client system; and
    deleting the one or more first secrets from the second storage location.

2. The computer-implemented method of claim 1, wherein the receiving the first read request includes obtaining a first indication, at a first time, that a file descriptor is opened.

3. The computer-implemented method of claim 2, wherein the file descriptor corresponds to a pseudo-filesystem object of the one or more pseudo-filesystem objects.

4. The computer-implemented method of claim 2, further comprising:
    obtaining a second indication, at a second time, that the file descriptor is closed;
    wherein the second time is subsequent to the first time and a difference between the first time and the second time is shorter than the threshold time; and
    wherein the deleting the one or more first secrets from the second storage location is performed in response to the obtaining the second indication that the file descriptor is closed.

5. The computer-implemented method of claim 1, wherein the first read request is received by a pseudo-filesystem object of the one or more pseudo-filesystem objects; and
    wherein the obtaining the one or more first secrets is performed by a daemon corresponding to the pseudo-filesystem object.

6. The computer-implemented method of claim 5, wherein the storing, by the client system, the one or more first secrets comprises the daemon storing the one or more first secrets in the second storage location; and
    wherein the second storage location comprises random access memory.

7. The computer-implemented method of claim 5, wherein the initiating the transmission of the one or more first secrets comprises the daemon presenting the one or more first secrets such that the one or more first secrets are retrievable by the client program from the pseudo-filesystem object.

8. The computer-implemented method of claim 1, wherein the one or more first secrets are selected from the group consisting of passwords, connection strings, usernames, keys, and tokens.

9. The computer-implemented method of claim 1, wherein the first read request is received by a pseudo-filesystem object of the one or more pseudo-filesystem objects; and
    wherein the pseudo-filesystem object mimics a file system object of the one or more filesystem objects.

10. The computer-implemented method of claim 1, further comprising:
    receiving, by the secrets engine, a second read request from the client program in the client system;
    initiating, by the secrets engine, the timer in response to receiving the second read request;
    obtaining, by the secrets engine, in response to the receiving the second read request, one or more second secrets from the secrets store, wherein the one or more second secrets are stored in one or more filesystem objects in the secrets store;
    determining if the timer has exceeded the threshold time;
    deleting the one or more second secrets from the second storage location in response to determining that the timer has not exceeded the threshold time, forgoing initiating, in response to the second read request, a transmission of the one or more second secrets to the client program.

11. A system comprising:
    a processor; and
    a memory in communication with the processor, the memory containing program instructions that, when executed by the processor, are configured to cause the processor to perform a method, the method comprising:
    receiving, by a secrets engine, a first read request from a client program in a client system;

initiating, by the secrets engine, a timer in response to receiving the first read request;
obtaining, by the secrets engine, in response to the receiving the first read request, one or more first secrets from a secrets store, wherein the one or more first secrets are stored in one or more filesystem objects in the secrets store;
wherein the obtaining includes;
receiving the one or more first secrets via an encrypted communication channel with the secrets store; and
storing the one or more first secrets in a first storage location in the secrets engine, wherein the one or more first secrets are stored in one or more pseudo-filesystem objects in the first storage location;
determining if the timer has exceeded a threshold time;
initiating, in response to the first read request, a transmission of the one or more first secrets to the client program in response to determining that the timer has not exceeded the threshold time;
storing, by the client system, the one or more first secrets in a second storage location in the client system; and
deleting the one or more first secrets from the second storage location.

12. The system of claim 11, further comprising receiving, by the secrets engine, a second read request from the client program in the client system, wherein the receiving the second read request includes obtaining a first indication, at a first time, that a file descriptor is opened.

13. The system of claim 12, wherein the file descriptor corresponds to a pseudo-filesystem object of the one or more pseudo-filesystem objects.

14. The system of claim 12, the method further comprising:
initiating, by the secrets engine, the timer in response to receiving the second read request;
obtaining, by the secrets engine, in response to the receiving the second read request, one or more second secrets from the secrets store, wherein the one or more second secrets are stored in one or more filesystem objects in the secrets store;
obtaining a second indication, at a second time, that the file descriptor is closed;
wherein the second time is subsequent to the first time and a difference between the first time and the second time is shorter than the threshold time; and
wherein the deleting the one or more second secrets from the second storage location is performed in response to the obtaining the second indication that the file descriptor is closed.

15. The system of claim 11, wherein the first read request is received by a pseudo-filesystem object of the one or more pseudo-filesystem objects; and
wherein the obtaining the one or more first secrets is performed by a daemon corresponding to the pseudo-filesystem object.

16. The system of claim 11, wherein the first read request is received by a pseudo-filesystem object of the one or more pseudo-filesystem objects; and
wherein the pseudo-filesystem object mimics a file system object of the one or more filesystem objects.

17. A computer program product comprising a computer readable storage medium having program instructions embodied therewith, the program instructions executable by a processor to cause the processor to perform a method, the method comprising:
receiving, by a secrets engine, a read request from a client program in a client system;
initiating, by the secrets engine, a timer in response to receiving the first read request;
obtaining, by the secrets engine, in response to the receiving the read request, one or more first secrets from a secrets store, wherein the one or more first secrets are stored in one or more filesystem objects in the secrets store;
wherein the obtaining includes:
receiving the one or more first secrets via an encrypted communication channel with the secrets store; and
storing the one or more first secrets in a first storage location in the secrets engine, wherein the one or more first secrets are stored in one or more pseudo-filesystem objects in the first storage location;
determining if the timer has exceeded a threshold time;
initiating, in response to the read request, a transmission of the one or more first secrets to the client program in response to determining that the timer has not exceeded the threshold time;
storing, by the client system, the one or more first secrets in a second storage location in the client system; and
deleting the one or more first secrets from the second storage location.

18. The computer program product of claim 17, further comprising receiving, by the secrets engine, a second read request from the client program in the client system, wherein the receiving the second read request includes obtaining a first indication, at a first time, that a file descriptor is opened.

19. The computer program product of claim 18, the method further comprising:
initiating, by the secrets engine, the timer in response to receiving the second read request;
obtaining, by the secrets engine, in response to the receiving the second read request, one or more second secrets from the secrets store, wherein the one or more second secrets are stored in one or more filesystem objects in the secrets store;
obtaining a second indication, at a second time, that the file descriptor is closed;
wherein the second time is subsequent to the first time and a difference between the first time and the second time is shorter than the threshold time; and
wherein the deleting the one or more second secrets from the second storage location is performed in response to the obtaining the second indication that the file descriptor is closed.

20. The computer program product of claim 17, wherein the first read request is received by a pseudo-filesystem object of the one or more pseudo-filesystem objects; and
wherein the pseudo-filesystem object mimics a file system object of the one or more filesystem objects.

* * * * *